US009363232B1

(12) United States Patent
Adams

(10) Patent No.: US 9,363,232 B1
(45) Date of Patent: Jun. 7, 2016

(54) DETECTING AND PREVENTING SESSION HIJACKING

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 241 days.

(21) Appl. No.: 14/152,079

(22) Filed: Jan. 10, 2014

(51) Int. Cl.
*H04L 29/08* (2006.01)
*H04L 29/06* (2006.01)

(52) U.S. Cl.
CPC ....................................... *H04L 63/02* (2013.01)

(58) Field of Classification Search
CPC ............ H04L 63/1466; H04L 63/0807; H04L 63/0876; H04L 63/1441; H04L 67/02; H04L 67/14; H04L 67/16; H04L 67/142; H04L 9/3213; H04L 9/3297
USPC ..................................... 726/4–6, 22; 713/159
See application file for complete search history.

(56) References Cited

U.S. PATENT DOCUMENTS

2005/0132222 A1\* 6/2005 Petrovic ................ H04L 9/3213
726/4
2010/0161973 A1\* 6/2010 Chin ........................ H04L 63/08
713/159

OTHER PUBLICATIONS

Dacosta et al., "One-Time Cookies: Preventing Session Hijacking Attacks with Stateless Authentication Tokens", ACM Transactions on Internet Technology, vol. 12, No. 1, Article 1, Jun. 2012.*
Wikipedia, "HTTP Cookie", http://en.wikipedia.org/wiki/HTTP_cookie, Nov. 7, 2013, 20 pages.
Wikipedia, "Session ID", http://en.wikipedia.org/wiki/Session_ID, Nov. 5, 2013, 2 pages.

\* cited by examiner

*Primary Examiner* — Kambiz Zand
*Assistant Examiner* — Noura Zoubair
(74) *Attorney, Agent, or Firm* — Harrity & Harrity, LLP

(57) ABSTRACT

A security device may receive a response associated with a request. The response may include original session information. The request may be associated with a user device. The security device may modify the original session information to create modified session information. The security device may store information associated with the modified session information. The security device may provide the response, including the modified session information, to the user device. The security device may receive another request. The other request may include the modified session information. The security device may determine that the modified session information is not current session information based on the information associated with the modified session information. The security device may provide the other request without including the original session information.

20 Claims, 10 Drawing Sheets

DETECTING AND PREVENTING SESSION HIJACKING

BACKGROUND

A session identifier may include information that identifies a session (e.g., a semi-permanent interactive information interchange) between a user device and a server device (e.g., a server device that hosts a web site). The server device may generate the session identifier when the user device sends an initial request to the server device, and may provide the session identifier (e.g., in a session cookie) to the user device. The user device may provide the session identifier to the server device (e.g., each time the user device sends a request to the server device) such that the server device can identify the session with the user device.

SUMMARY

According to some possible implementations, a security device may include one or more processors configured to: receive a response associated with a request, where the response may include original session information, and where the request may be associated with a user device; modify the original session information to create modified session information; store information associated with the modified session information; provide the response, including the modified session information, to the user device; receive another request, where the other request may include the modified session information; determine that the modified session information is not current session information based on the information associated with the modified session information; and provide the other request without including the original session information.

According to some possible implementations, a computer-readable medium may store one or more instructions that, when executed by one or more processors, cause the one or more processors to: receive a response associated with a request, where the response may include original session information, and where the request may be associated with a user device; modify the original session information to create modified session information; store information associated with the modified session information; provide the response, including the modified session information, to the user device; receive another request, where the other request may include the modified session information; determine that the modified session information is current session information based on the information associated with the modified session information; determine the original session information based on the modified session information; and provide the other request including the original session information rather than the modified session information.

According to some possible implementations, a method may include: receiving, by a device, a response associated with a request, where the response may include an original session identifier, and where the request may originate from a user device; modifying, by the device, the original session identifier to create a modified session identifier; storing, by the device, information associated with the modified session identifier; sending, by the device, the response including the modified session identifier to the user device; receiving, by the device, another request, where the other request may include the modified session identifier; determining, by the device, whether the modified session identifier is a current session identifier based on the information associated with the modified session identifier; and providing, by the device, the other request based on determining whether the modified session identifier is a current session identifier, where the other request may include the original session identifier when the modified session information is the current session identifier, and where the other request may exclude the original session identifier when the modified session information is not the current session identifier.

DETAILED DESCRIPTION

The following detailed description of example implementations refers to the accompanying drawings. The same reference numbers in different drawings may identify the same or similar elements.

An attacker device (e.g., associated with a hacker) may attempt to act as a user device to access a web site by using information associated with the user device. For example, the attacker device may obtain session information (e.g., a session cookie, a session identifier, etc.) associated with the user device (e.g., via a cross site scripting ("XSS") attack, via a man-in-the-middle-attack, via observation of an unsecure network, etc.) and a web site (e.g., hosted by a server device) being browsed by the user device, and the attacker device may use the session information to act as the user device (e.g., the attacker device may hijack the session of the user device). Implementations described herein may allow a security device, associated with a user device and/or a server device, to prevent an attacker device from hijacking a session of the user device by modifying session information in a manner such that the security device may determine that the session information has been compromised.

Figure 1A:
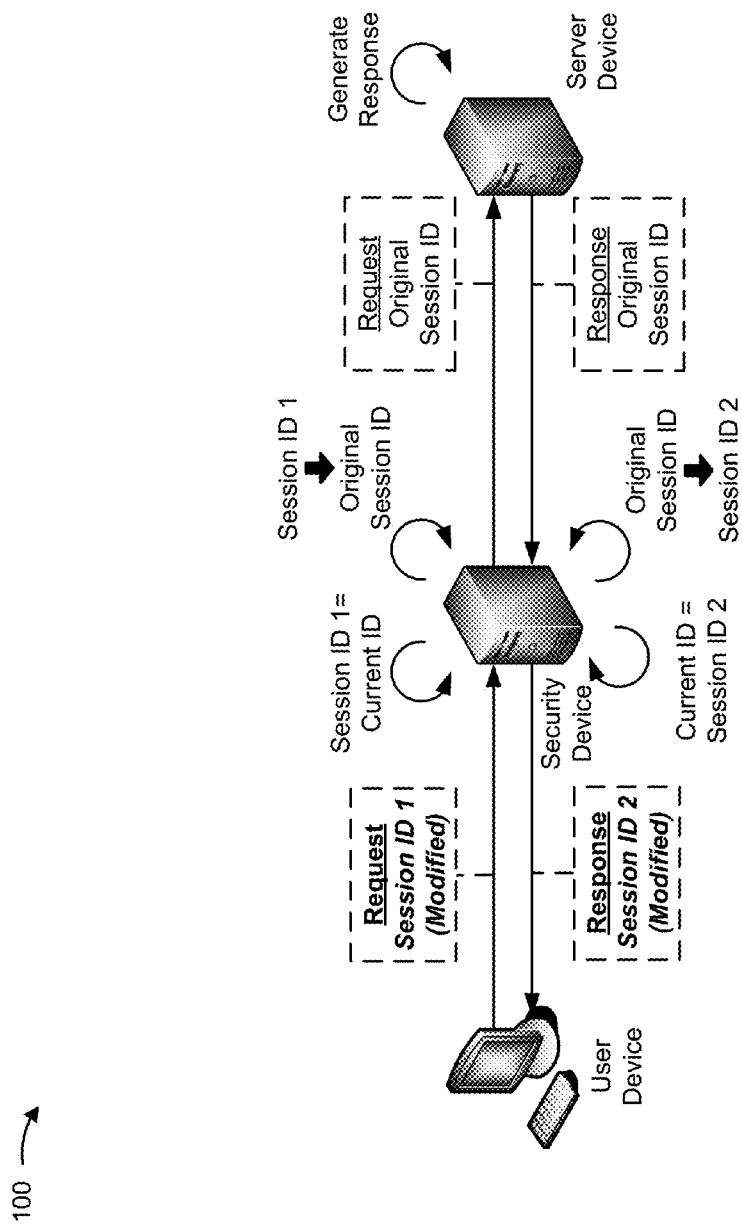
FIGS. 1A and 1B are diagrams of an overview of an example implementation described herein.
Figure 1B:
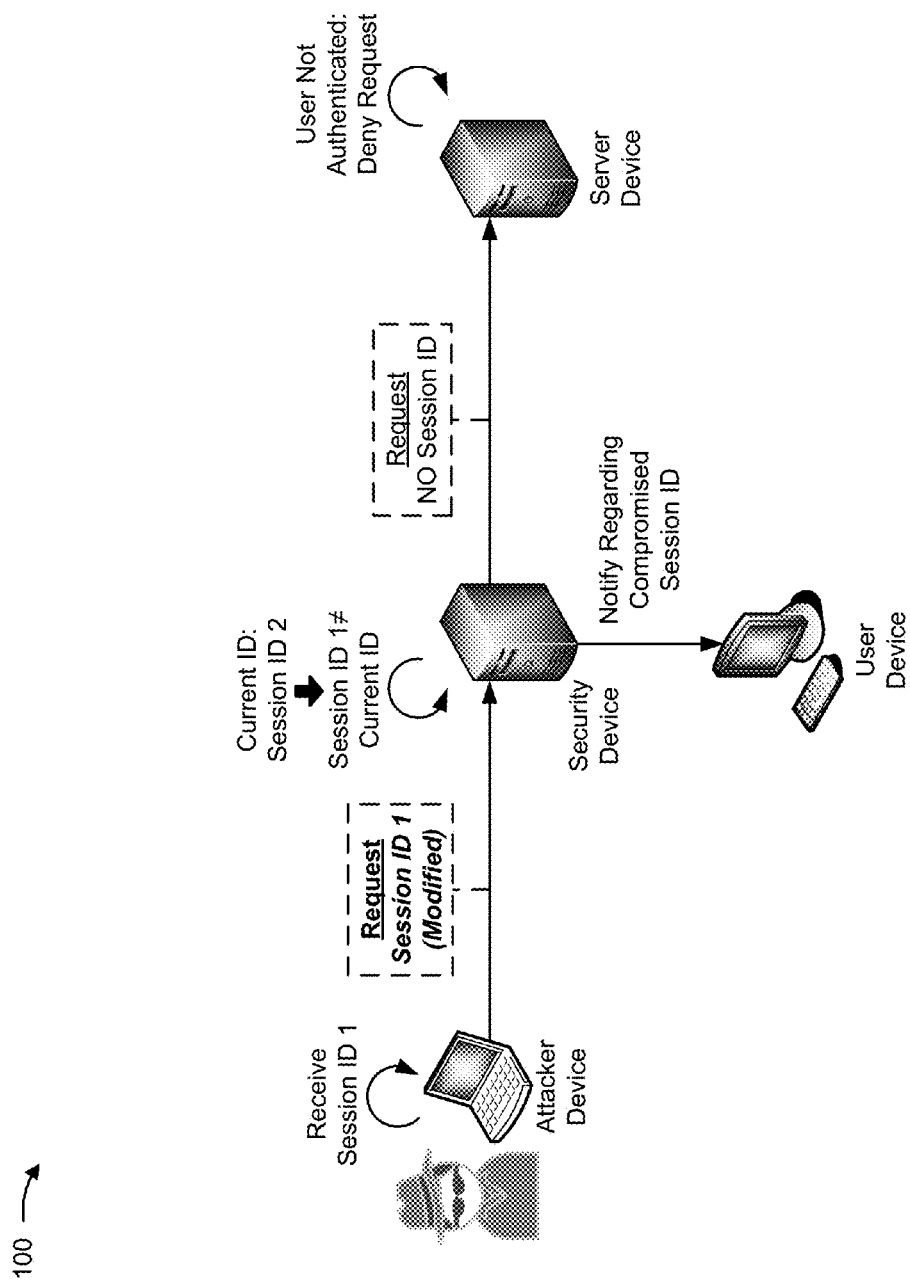

FIGS. 1A and 1B are diagrams of an overview of an example implementation 100 described herein. For the purposes of example implementation 100, assume that a user device is browsing a web site, hosted by a server device. Further, assume that the server device has generated original session information that includes an original session identifier (e.g., original session ID), and that a security device has modified the original session ID to create a first modified session identifier, session ID 1 (e.g., session ID 1 is a modified version of the original session ID). Additionally, assume that the security device has stored information associated with the original session ID and session ID 1, and that the security device has provided session ID 1 to the user device. Finally, assume that the security device is configured to determine whether session information, included in a request from the user device, has been compromised (e.g., received by a device other than the user device).

As shown in FIG. 1A, the user device may send, to the server device, a request (e.g., associated with browsing the web site) that includes session ID 1. As shown, the security device may receive session ID 1 and may determine (e.g., based on information stored by the security device) that session ID 1 is a current session identifier associated with the session between the user device and the server device. As further shown, the security device may determine the original session ID based on session ID 1. As shown, the security device may forward the request, including the original session ID, to the server device.

As further shown in FIG. 1A, the server device may generate a response to the request, and may provide the response, including the original session ID, to the security device. As shown, the security device may receive the response, and may modify the original session ID to create second modified session identifier, session ID 2. As shown, the security device may store information that indicates that the current session ID is session ID 2 (e.g., rather than session ID 1). As further shown, the security device may provide the response, including session ID 2, to the user device.

For the purposes of FIG. 1B, assume that an attacker device has obtained session ID 1 and is attempting to hijack the session between the user device and the server device. As shown, the attacker device may send a request, including session ID 1, to the security device, and the security device may determine (e.g., based on the information, stored by the security device) that the current session ID is session ID 2 (e.g., that session ID 1 is not the current session ID). As shown, the security device may send the request, without including any session information, to the server device, and the server device may deny the request (e.g., when no session information indicates that a user has not be authenticated). As further shown, the security device may provide a notification to the user device associated with the compromised session ID (e.g., a notification that session ID 1 has been compromised). In this way, a security device may prevent an attacker device from hijacking a session, between a user device and a server device, by modifying session information in a manner such that the security device may determine that the session information has been compromised.

Figure 2:
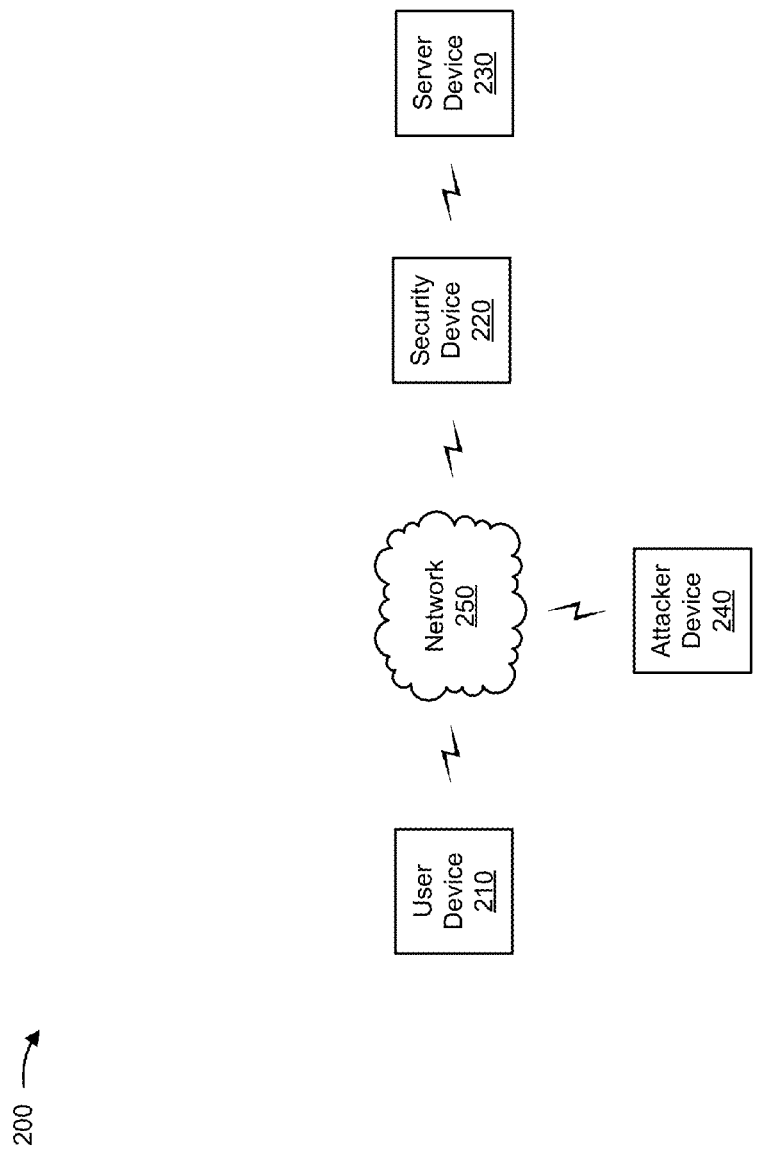
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a security device 220, a server device 230, an attacker device 240, and a network 250.

User device 210 may include one or more devices capable of communicating with other devices (e.g., server device 230) via a network (e.g., network 250), and/or capable of receiving information provided by another device (e.g., server device 230). For example, user device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, user device 210 may be capable of generating and sending (e.g., to server device 230) a request (e.g., a request to receive information stored by server device 230).

Security device 220 may include one or more devices capable of receiving, providing, generating, storing, and/or processing information received and/or provided via a network (e.g., network 250) and/or another device (e.g., server device 230, user device 210, etc.). For example, security device 220 may include a computing device, such as a server. In some implementations, security device 220 may receive information from and/or provide information to user device 210 (e.g., via network 250) and/or server device 230. Additionally, or alternatively, security device 220 may include one or more devices capable of processing and/or transferring communications (e.g., a request, a response, etc.) between user device 210 and server device 230. For example, security device 220 may include a network device, such as a reverse proxy, a server (e.g., a proxy server), a traffic transfer device, a firewall, a router, a load balancer, or the like.

In some implementations, security device 220 may be capable of receiving, processing, encrypting, modifying, and/or providing session information associated with user device 210 and/or server device 230. Additionally, or alternatively, security device 220 may be capable of determining whether session information is current session information (e.g., based on information stored by security device 220 and/or information stored by another device, etc.).

Security device 220 may be used in connection with a single user device 210 or a group of user devices 210. Communications may be routed through security device 220 to reach the one or more user devices 210. For example, security device 220 may be positioned within a network as a gateway to a private network that includes one or more user devices 210. Additionally, or alternatively, security device 220 may be used in connection with a single server device 230 or a group of server devices 230 (e.g., a data center). Communications may be routed through security device 220 to reach the one or more server devices 230. For example, security device 220 may be positioned within a network as a gateway to a private network that includes one or more server devices 230. In some implementations, security device 220 may be included in server device 230.

Server device 230 may include one or more devices capable of receiving, providing, generating, storing, and/or processing information received and/or provided via a network (e.g., network 250) and/or another device (e.g., security device 220). For example, server device 230 may include a computing device, such as a server (e.g., an application server, a content server, a host server, a web server, etc.). In some implementations, server device 230 may be capable of generating, receiving, and/or providing session information associated with user device 210.

Attacker device 240 may include one or more devices capable of communicating with another device (e.g., server device 230) via a network (e.g., network 250), and/or capable of receiving information provided by another device (e.g., server device 230). For example, attacker device 240 may include a computing device, such as a laptop computer, a tablet computer, a handheld computer, a desktop computer, a mobile phone (e.g., a smart phone, a radiotelephone, etc.), a personal digital assistant, or a similar device. In some implementations, attacker device 240 may be capable of generating and sending (e.g., to server device 230) a request (e.g., a request associated an application hosted by server device 230). In some implementations, attacker device 240 may be capable of receiving, intercepting, stealing, or otherwise obtaining session information associated with user device 210 and/or server device 230.

Network 250 may include one or more wired and/or wireless networks. For example, network 250 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 250 may allow communication between devices, such as user device 210, security device 220, server device 230, and/or attacker device 240.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
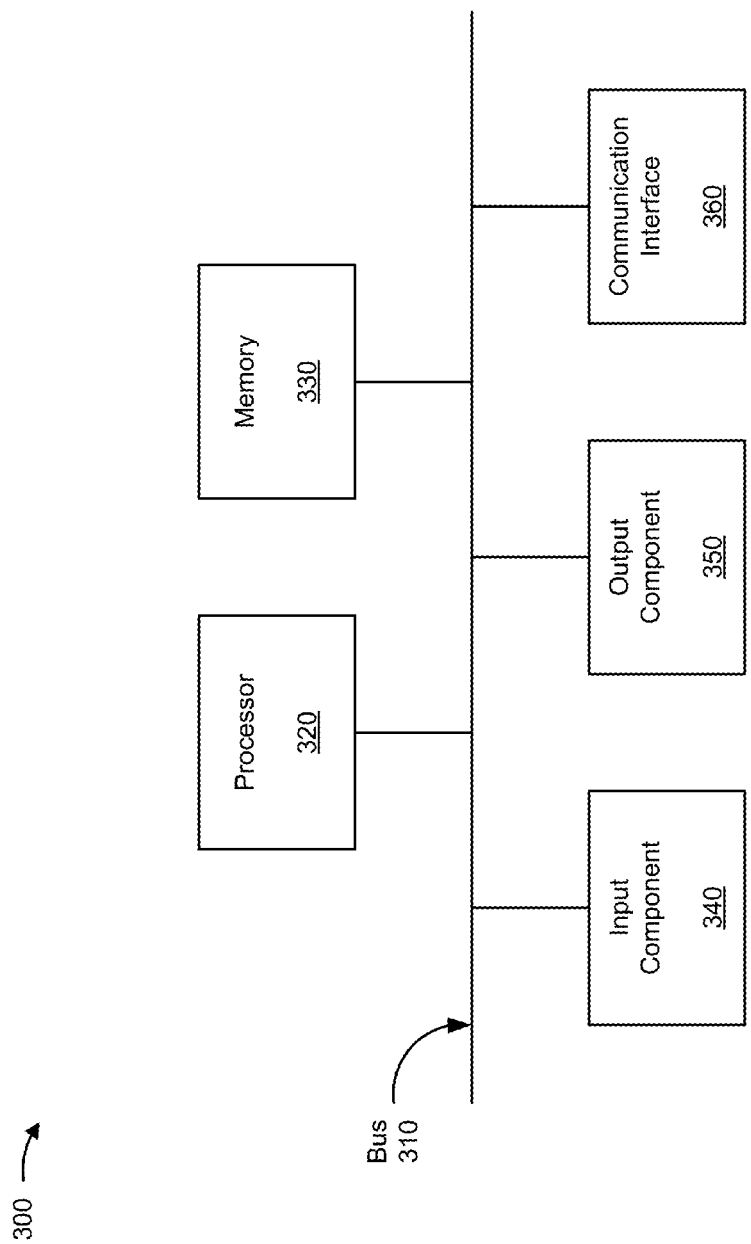
FIG. 3 is a diagram of example components of one or more devices of FIG. 2.

FIG. 3 is a diagram of example components of a device 300. Device 300 may correspond to user device 210, security device 220, server device 230, and/or attacker device 240. Additionally, or alternatively, each of user device 210, security device 220, server device 230, and/or attacker device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
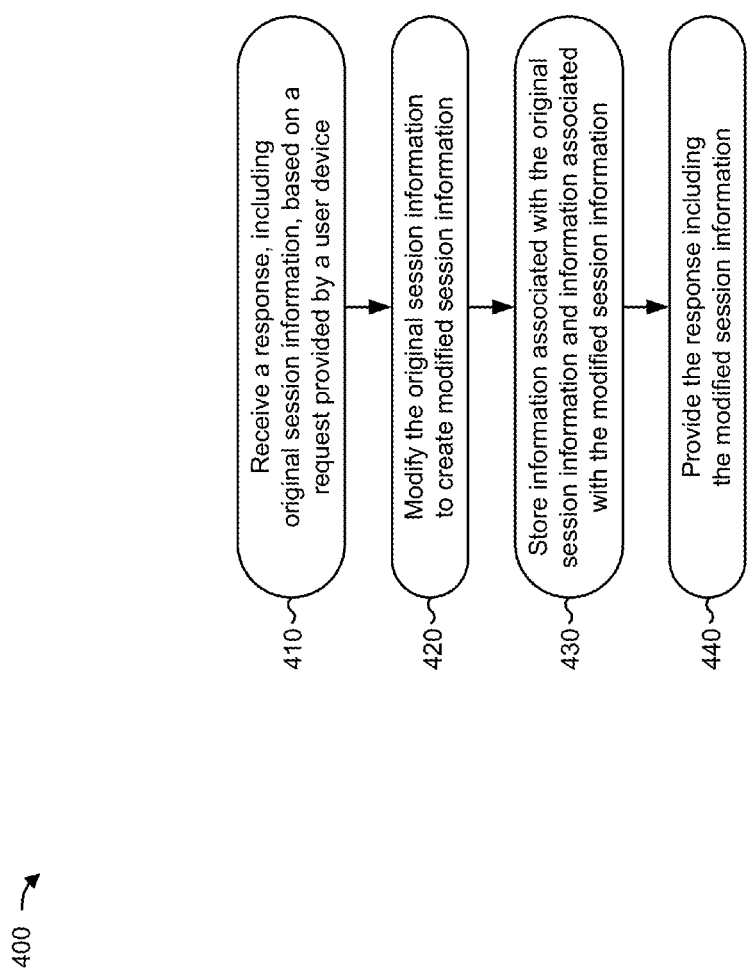
FIG. 4 is a flow chart of an example process for modifying original session information and providing modified session information.

FIG. 4 is a flow chart of an example process 400 for modifying original session information and providing modified session information. In some implementations, one or more process blocks of FIG. 4 may be performed by security device 220. In some implementations, one or more process blocks of FIG. 4 may be performed by another device or a group of devices separate from or including security device 220, such as server device 230.

As shown in FIG. 4, process 400 may include receiving a response, including original session information, based on a request provided by a user device (block 410). For example, security device 220 may receive, from server device 230, a response, including original session information, based on a request provided by user device 210. In some implementations, security device 220 may receive the response when server device 230 provides the response (e.g., after server device 230 has received the request from user device 210). Additionally, or alternatively, security device 220 may receive the response when server device 230 attempts to provide the response to user device 210 (e.g., when security device 220 is positioned to receive a response provided by server device 230).

A request may include a message, sent from user device 210 to server device 230 (e.g., via security device 220 and/or network 250), to provide information stored by server device 230. A response may include a message, sent from server device 230 to user device 210, that includes information that may be responsive to the request. For example, user device 210 may send, to server device 230, a request associated with browsing a web site hosted by server device 230, and server device 230 may generate and provide, to security device 220, a response to the request (e.g., when security device 220 is configured to receive the response). In some implementations, the response, generated by server device 230, may include original session information associated with user device 210.

Original session information may include information associated with an interaction between user device 210 and server device 230, such as a session cookie, a session identifier, or the like. The original session information may be used, by server device 230, to determine information associated with a previous interaction between user device 210 and server device 230 (e.g., server device 230 may recognize user device 210 each time a request, including the original session information, is received by server device 230).

In some implementations, the original session information may include an original session identifier that identifies the session between user device 210 and server device 230 (e.g., a string of characters, an original session identification ("ID") number, etc.). Additionally, or alternatively, the original session information may include other information associated with the session between user device 210 and server device 230. For example, the original session information may include information associated with a session between user device 210 and server device 230, such as a domain name associated with the session (e.g., when a session is associated with a particular domain name), a uniform resource locator ("URL") associated with the session (e.g., when a session is associated with a particular resource associated with the URL), or information that identifies a period of time associated with the session (e.g., when a session is configured to expire after the period of time expires, etc.). In some implementations, the original session information may be used by security device 220 when security device 220 modifies the original session information (e.g., such that the modified session information may include information included in the original session information, etc.).

As further shown in FIG. 4, process 400 may include modifying the original session information to create modified session information (block 420). For example, security device 220 may modify the original session information, received from server device 230, to create modified session information. In some implementations, security device 220 may modify the original session information when security device 220 receives the original session information. Additionally, or alternatively, security device 220 may modify the original session information when security device 220 receives information, indicating that security device 220 is to modify the original session information, from another device, such as server device 230.

In some implementations, security device 220 may modify the original session information by adding information to the original session information. For example, security device 220 may add a salt value (e.g., a string of randomized characters) to an original session identifier included in the original session information. In some implementations, security device 220 may store information that identifies the added information (e.g., such that security device 220 may be capable of identifying and removing the added information at a later time).

Additionally, or alternatively, security device 220 may modify the original session information by encrypting the original session information. For example, security device 220 may encrypt the original session information using an encryption algorithm, such as a data encryption standard ("DES") algorithm, an advanced encryption standard ("AES") algorithm, an international data encryption algorithm ("IDEA"), or another encryption algorithm. Additionally, or alternatively, security device 220 may encrypt the original session information using another type of encryption method.

In some implementations, security device 220 may modify the original session information in another manner (e.g., the listed modification techniques are not exhaustive of all possible modification techniques). In some implementations, security device 220 may store information associated with one or more modification techniques (e.g., security device 220 may store a data structure of possible modification techniques). In some implementations, security device 220 may modify the original session information using one or more modification techniques. For example, security device 220 may modify an original session identifier, included in the original session information, by adding a salt value to the original session identifier, and security device 220 may encrypt the salted original session identifier. Additionally, or alternatively, security device 220 may modify the original session information using a different modification technique each time security device 220 modifies the original session information. For example, security device 220 may modify the original session information (e.g., included in a first response associated with user device 210) using a first modification technique, and security device 220 may modify the original session information (e.g., included in a second response associated with user device 210), using a second modification technique (e.g., the second modification technique being different than the first modification technique).

As further shown in FIG. 4, process 400 may include storing information associated with the original session information and information associated with the modified session information (block 430). For example, security device 220 may store information associated with the original session information and may store information associated with the modified session information. In some implementations, security device 220 may store the information associated with the original session information when security device 220 receives the original session information. Additionally, or alternatively, security device 220 may store the information associated with the modified session information when security device 220 modifies the original session information. Additionally, or alternatively, security device 220 may store the information associated with the original session information and/or may store the information associated with the modified session information when security device 220 receives information, indicating that security device 220 is to store the information, from another device, such as server device 230.

In some implementations, security device 220 may store information associated with the original session information (e.g., an original session identifier, a domain name associated with the session, a URL associated with the session, information that identifies a period of time associated with the session, etc.) such that security device 220 may re-create the original session information (e.g., within the modified session information, etc.).

Additionally, or alternatively, security device 220 may store information associated with the modified session information (e.g., a modified session identifier, a salt value associated with the modified session information, information associated with an encryption algorithm used to modify the session identifier, etc.) such that security device 220 may determine the original session information based on the modified session information.

Additionally, or alternatively, security device 220, may store information that identifies current session information associated with the modified session information. Current session information may include information that identifies modified session information that was included in a recent response provided by security device 220. For example, the current session information may include a modified session identifier included in the most recent response (e.g., associated with a session between user device 210 and server device 230) provided by security device 220. In some implementations, the current session information may be modified each time security device 220 modifies the original session information (e.g., each time security device 220 sends a response to user device 210). For example, security device 220 may create a first modified session identifier, and the first modified session identifier may be stored as the current session identifier. In this example, when security device 220 creates a second modified identifier, the second modified session identifier may be stored as the current session identifier (e.g., rather than the first modified session identifier). Additionally, or alternatively, the current session information may include information associated with a set of modified session identifiers (e.g., the last three modified session identifiers may be identified as current session identifiers, etc.).

In some implementations, security device 220 may store the original session information and/or the information associated with the modified session information in a memory location (e.g., a RAM, a hard disk, etc.) of security device 220, and security device 220 may store an indication that the information associated with the original session information and/or the information associated with the modified session information is associated with user device 210 and/or server device 230. Additionally, or alternatively, security device 220 may transmit the information associated with the original session information and/or the information associated with the modified session information to another device (e.g., server device 230, etc.) for storage.

In some implementations, security device 220 may delete (e.g., remove from memory) stored information. For example, security device 220 may delete stored information associated with the modified session information when a threshold quantity of modified session identifiers is satisfied (e.g., when security device 220 is configured to store a threshold quantity of session identifiers). In other words, security device 220 may overwrite stored information with new modified session information when a threshold quantity of information is satisfied.

As further shown in FIG. 4, process 400 may include providing the response including the modified session information (block 440). For example, security device 220 may provide the response, including the modified session information, to user device 210. In some implementations, security device 220 may provide the response when security device 220 modifies the original session information. Additionally, or alternatively, security device 220 may provide the response when security device 220 stores the information associated with the original session information and/or the information associated with the modified session information (e.g., after security device 220 stores the information). Additionally, or alternatively, security device 220 may provide the response when security device 220 receives information, indicating that security device 220 is to provide the response, from another device (e.g., server device 230).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5:
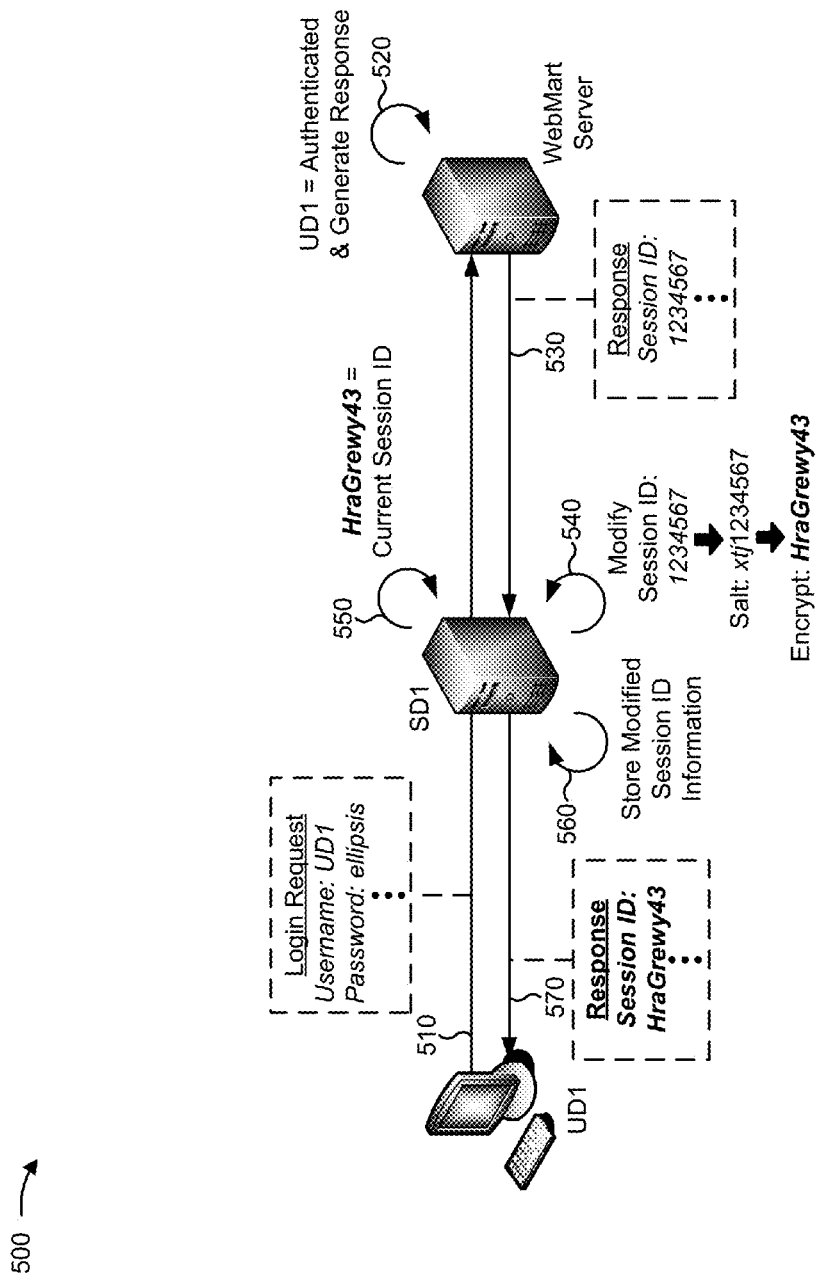
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that a user of a user device, UD1, wishes to log into a web site that is hosted by a WebMart server. Further, assume that a security device, SD1, is positioned to determine whether session information, associated with the browsing session of UD1, has been compromised.

As shown in FIG. 5, and by reference number 510, UD1 may send, to the WebMart server (e.g., via SD1), a login request associated with logging into the WebMart server. As shown, the login request may include a username (e.g, UD1) and a password (e.g., ellipsis) (e.g., assume that a user account, associated with UD1, has already been created). As shown by reference number 520, the WebMart server may receive the login request, may authenticate UD1 (e.g., based on the username and the password provided by UD1), and may generate a response to the request. As shown, the response may include original session information (e.g., a session cookie) that includes an original session identifier, 1234567, that identifies the UD1 session with the WebMart server. The session cookie may also include other information associated with the session (e.g., a time at which the session cookie expires, etc.). As further shown by reference number 530, the WebMart server may provide the response to SD1.

As further shown in FIG. 5, SD1 may receive the response provided by the WebMart server (e.g., before the response is sent to UD1). As shown by reference number 540, SD1 may modify the 1234567 session identifier (e.g., included in the response) by adding a salt value (e.g., xtj) to the 1234567 session identifier, and by encrypting the salted 1234567 session identifier (e.g., using an AES encryption algorithm) to create a modified session identifier, HraGrewy43. As shown by reference number 550, SD1 may store information that identifies HraGrewy43 as a current session identifier. As shown by reference number 560, SD1 may also store information associated with the HraGrewy43 session identifier. As shown by reference number 570, SD1 may provide the response, including the HraGrewy43 session identifier, to UD1.

As indicated above, FIG. 5 is provided merely as an example. Other examples are possible and may differ from what was described with regard to FIG. 5.

Figure 6:
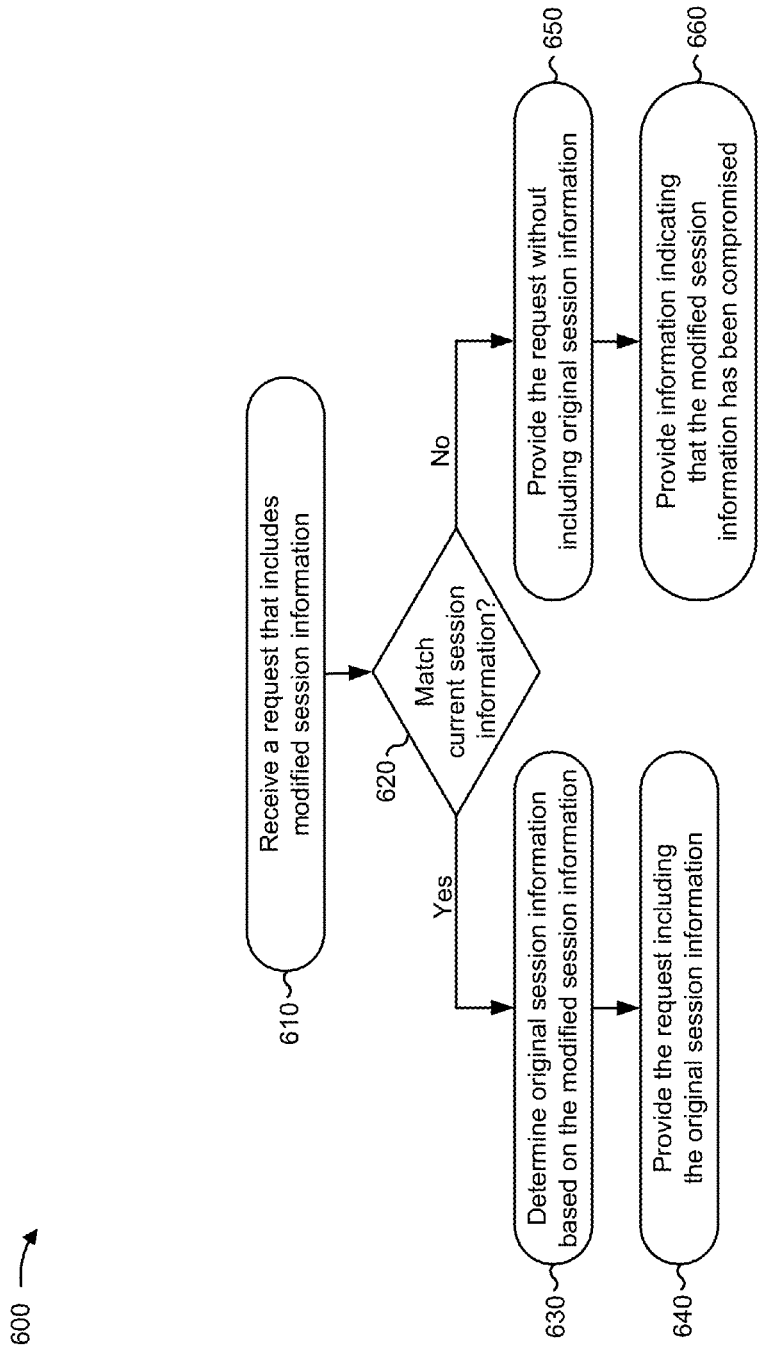
FIG. 6 is a flow chart of an example process for receiving modified session information and determining whether the modified session information has been compromised.

FIG. 6 is a flow chart of an example process 600 for receiving modified session information and determining whether the modified session information has been compromised. In some implementations, one or more process blocks of FIG. 6 may be performed by security device 220. In some implementations, one or more process blocks of FIG. 6 may be performed by another device or a group of devices separate from or including security device 220, such as server device 230.

As shown in FIG. 6, process 600 may include receiving a request that includes modified session information (block 610). For example, security device 220 may receive (e.g., from user device 210, from attacker device 240, etc.) a request that includes modified session information (e.g., a modified session identifier). In some implementations, security device 220 may receive the request when user device 210 or attacker device 240 provides the request (e.g., after security device 220 has modified the session information and provided the modified session information to user device 210). Additionally, or alternatively, security device 220 may receive the request from another device (e.g., another device included in network 250).

In some implementations, the request may include modified session information based on a previous interaction between user device 210 and server device 230. For example, security device 220 may receive, from server device 230, a response (e.g., to a first request sent by user device 210 to server device 230) that includes original session information (e.g., an original session identifier), and may modify the original session information (e.g., to create a modified session identifier). In this example, security device 220 may provide the modified session information to user device 210, and user device 210 may send a second request, to security device 220 (e.g., destined for server device 230), that includes the modified session information.

In some implementations, security device 220 may receive the modified session information from another device, such as attacker device 240. For example, attacker device 240 may obtain the modified session information (e.g., associated with a user device 210 session), and attacker device 240 may send a request to security device 220 that includes the modified session information (e.g., when attacker device 240 is attempting to hijack the session associated with user device 210).

As further shown in FIG. 6, process 600 may include determining whether the modified session information is current session information (block 620). For example, security device 220 may determine whether the modified session information, received by security device 220, is current session information. In some implementations, security device 220 may determine whether the modified session information is current session information when security device 220 receives the modified session information. Additionally, or alternatively, security device 220 may determine whether the modified session information is current session information when security device 220 receives information, indicating that security device 220 is to determine whether the modified session information is current session information, from another device (e.g., server device 230).

In some implementations, security device 220 may determine whether the modified session information is current session information based on information stored by security device 220. For example, security device 220 may store (e.g., in a memory location of security device 220) information that identifies current session information, associated with a session between user device 210 and server device 230, and security device 220 may determine whether the modified session information is current session information based on the stored information (e.g., when the modified session information matches the information that identifies current session information, the modified session information is current session information, and when the modified session information does not match the information that identifies current session information, the modified session information is not current session information).

In some implementations, security device 220 may determine whether the modified session information is current session information to determine whether the modified session information has been compromised. For example, security device 220 may determine that the modified session information is not current session information (e.g., the modified session information does not match the current session information), and security device 220 may determine that the modified session information has been compromised (e.g., obtained by a device other than user device 210, such as attacker device 240).

As further shown in FIG. 6, if the modified session information is current session information (block 620—YES), then process 600 may include determining original session information based on the modified session information (block 630). For example, security device 220 may determine that the modified session information, included in a request received from user device 210 or attacker device 240, is current session information, and security device 220 may determine original session information based on the modified session information. In some implementations, security device 220 may determine the original session information when security device 220 determines that the modified session information is current session information. Additionally, or alternatively, security device 220 may determine the original session information when security device 220 receives information, indicating that security device 220 is to determine the original session information, from another device (e.g., server device 230).

In some implementations, security device 220 may determine the original session information based on information, associated with the modified session information, stored by security device 220. For example, security device 220 may store information associated with the modified session information (e.g., an encryption algorithm used to create a modified session identifier, a salt value included in the modified session identifier, etc.) and security device 220 may use the information to determine the original session information (e.g., by decrypting the modified session identifier to determine an original session identifier, by removing the salt value to determine the original session identifier, etc.). As another example, security device 240 may store information that identifies original session information that corresponds to the modified session information, and security device 220 may determine the original session information based on the information that identifies the corresponding modified session information.

As further shown in FIG. 6, process 600 may include providing the request including the original session information (block 640). For example, security device 220 may provide the request, including the original session information, to server device 230. In some implementations, security device 220 may provide the request when security device 220 determines the original session information (e.g., after security device 220 determines the original session information). Additionally, or alternatively, security device 220 may provide the request, including the original session information, when security device 220 receives information, indicating that security device 220 is to provide the request, from another device (e.g., server device 230).

In some implementations, server device 230 may receive the request, including the original session information, server device 230 may authenticate the session (e.g., based on the original session information), and server device 230 may generate a response to the request. Server device 230 may provide the response, including the original session information, to security device 220, and security device 220 may modify the original session information to create new modified session information (e.g., different modified session information than already created by security device 220), in the manner discussed above. In some implementations, the modification technique used by security device 220 to create the new modified session information may be different than the modification technique used to create the earlier modified session information (e.g., security device 220 may use a different modification technique to modify the original session information the second time).

As further shown in FIG. 6, if the modified session information is not current session information (block 620—NO), then process 600 may include providing the request without including original session information (block 650). For example, security device 220 may determine that the modified session information is not current session information, and security device 220 may send the request to server device 230 without including original session information (e.g., without including the original session information associated with the modified session information). In some implementations, security device 220 may provide the request, without including the original session information, when security device 220 determines that the modified session information is not current session information. Additionally, or alternatively, security device 220 may provide the request when security device 220 receives information, indicating that security device 220 is to provide the request, from another device (e.g., server device 230).

In some implementations, security device 220 may provide the request, without including the original session information, to server device 230, and server device 230 may terminate the session (e.g., such that user device 210 may be required to re-enter login information before server device 230 will respond to another request).

Additionally, or alternatively, security device 220 may provide the request, without including the original session information, to server device 230, and server device 230 may not respond to the request. For example, security device 220 may provide the request, without including any session information (e.g., security device 220 may remove the modified session information from the request), server device 230 may determine that the request is not authenticated (e.g., since no session information is included in the request), and server device 230 may not respond to the request (e.g., since the request is not authenticated).

Additionally, or alternatively, security device 220 may provide the request, without including the original session information, to server device 230, and server device 230 may generate a response indicating that the request is not authenticated. For example, security device 220 may provide the request including the modified session information, server device 230 may determine that the request is not authenticated (e.g., since server device 230 may not recognize the modified session information), and server device 230 may provide a response (e.g., to security device 220, etc.) that includes information that indicates that the request was not authenticated.

As further shown in FIG. 6, process 600 may include providing information indicating that the modified session information has been compromised (block 660). For example, security device 220 may provide, to user device 210, information indicating that the modified session information has been compromised. In some implementations, security device 220 may provide the information, indicating that the modified session information has been compromised, when security device 220 provides the request, without including the original session information, to server device 230 (e.g., after security device 220 provides the request). Additionally, or alternatively, security device 220 may provide the information when security device 220 determines that the modified session information is not current session information. Additionally, or alternatively, security device 220 may provide the information, indicating that the modified session information has been compromised, when security device 220 receives information, indicating that security device 220 is to provide the information, from another device (e.g., server device 230).

In some implementations, the information indicating that the modified session information has been compromised may include information associated with a warning. For example, security device 220 may provide, to user device 210, a warning associated with the modified session information (e.g., a warning regarding use of an unsecure connection, a warning regarding changing an account password associated with user device 210, etc.). Additionally, or alternatively, the information indicating that the modified session information has been comprised may include a notification (e.g., a notification indicating that the modified session information is not current session information, a notification indicating that the user must re-enter login information, etc.).

In some implementations, security device 220 may provide information, indicating that the original session information has been compromised, to a storage location (e.g., a storage location associated with security device 220) associated with storing compromised session information. For example, security device 220 may provide the information (e.g., the original session information) to a storage location configured to store information associated with compromised session information (e.g., to allow security device 220 to recognize the compromised session information at a later time).

In some implementations, security device 220 may not know whether a device, associated with a request, is user device 210 (e.g., a legitimate device) or attacker device 240 (e.g., a session hijacking device). However, security device need not determine whether the device is user device 210 or attacker device 240, since security device 220 may cause server device 230 to terminate the session any time security device 220 determines that more than one device is attempting to use the session.

For example, in some implementations, all responses received by user device 210 (e.g., that pass through security device 220) include unique current modified session information (e.g., based on the original session information provided by server device 230). In this example, security device 220 may store information that identifies the current modified session information (e.g., such that security device 220 will only approve a request that includes the current modified session information). In the event that a request is received by security device 220 that includes non-current modified session information, security device 220 may provide, to server device 230, information indicating that server device 230 is to terminate the session. As such, if any device (e.g., user device 210 or attacker device 240) subsequently provides any modified session information (e.g., either a current or non-current), then the modified session information will no longer be accepted. In effect, user device 210 (e.g., that stores any version of the modified session information) will be logged out of the session. If attacker device 240 intercepts the current session information and includes the current session information in a request to security device 220 before user device 210 provides a request that includes the current session information, then the session will be terminated (e.g., by server device 230) when user device 210 provides a request that includes the current session information. Otherwise if attacker device 240 intercepts the current session information and attempts to use it after user device 210 provides a request that includes the current session information, then the request provided by attacker device 240 will cause the session to be terminated by server device 230. In some implementations, a message may be provided to user device 210 and attacker device 240 indicating that the session has been compromised and/or terminated.

In this way, security device 220 may prevent a session, between user device 210 and server device 230, from being hijacked by attacker device 240 by recognizing when modified session information, provided in a request, has been compromised.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7A:
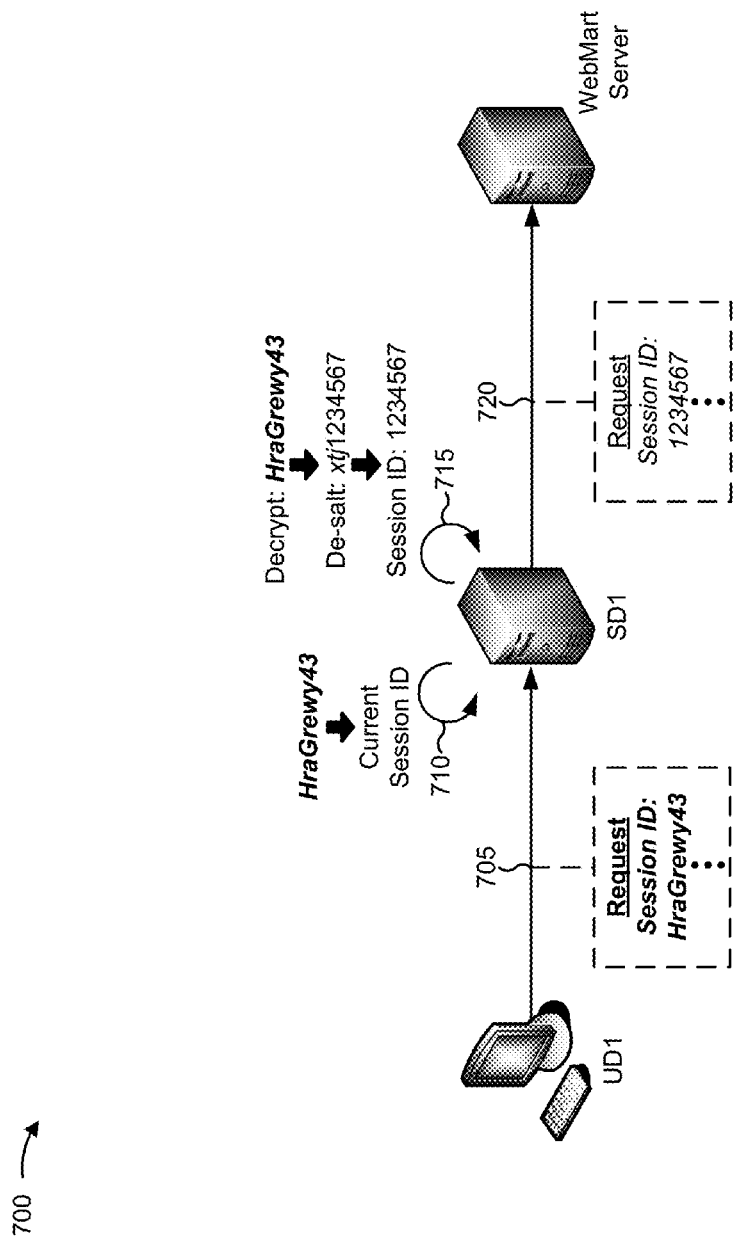
FIGS. 7A-7C are diagrams of an additional example implementation relating to the example process shown in FIG. 6.
Figure 7B:
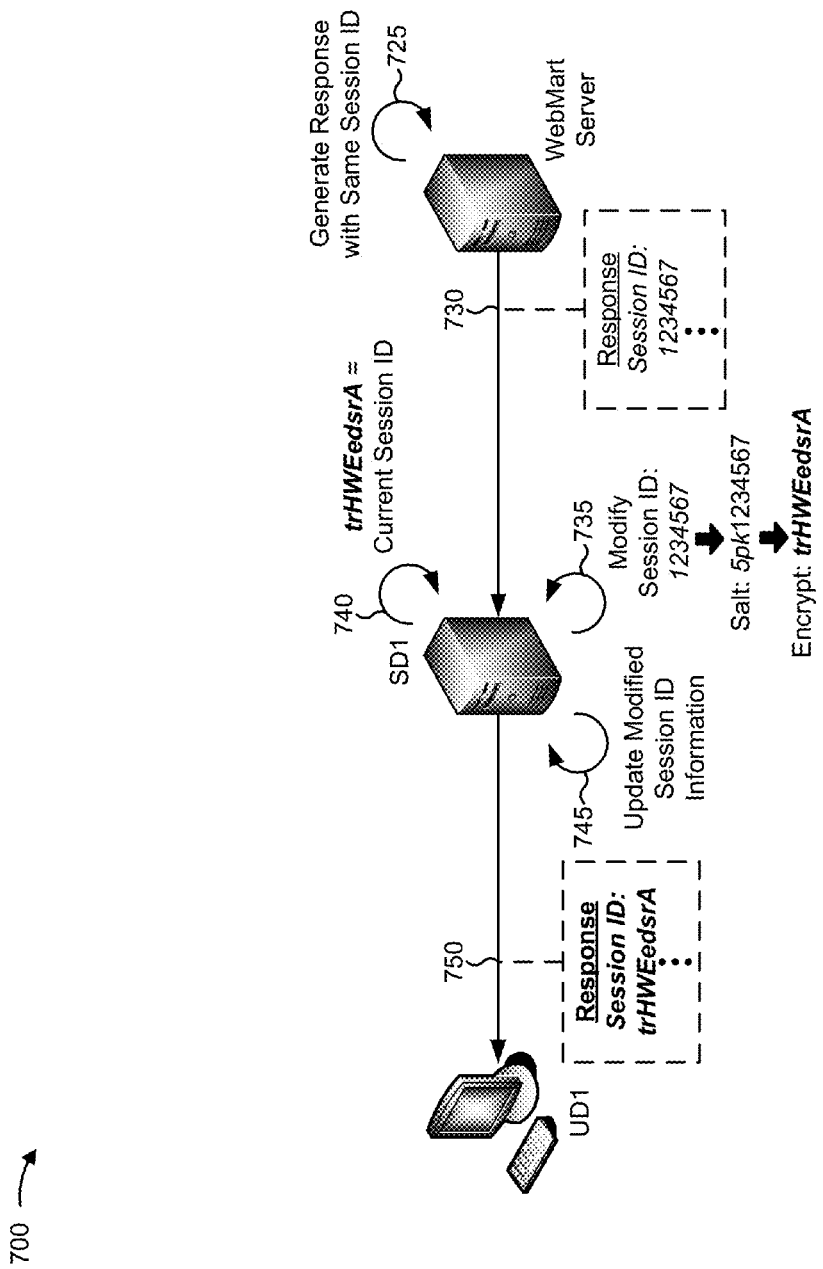
Figure 7C:
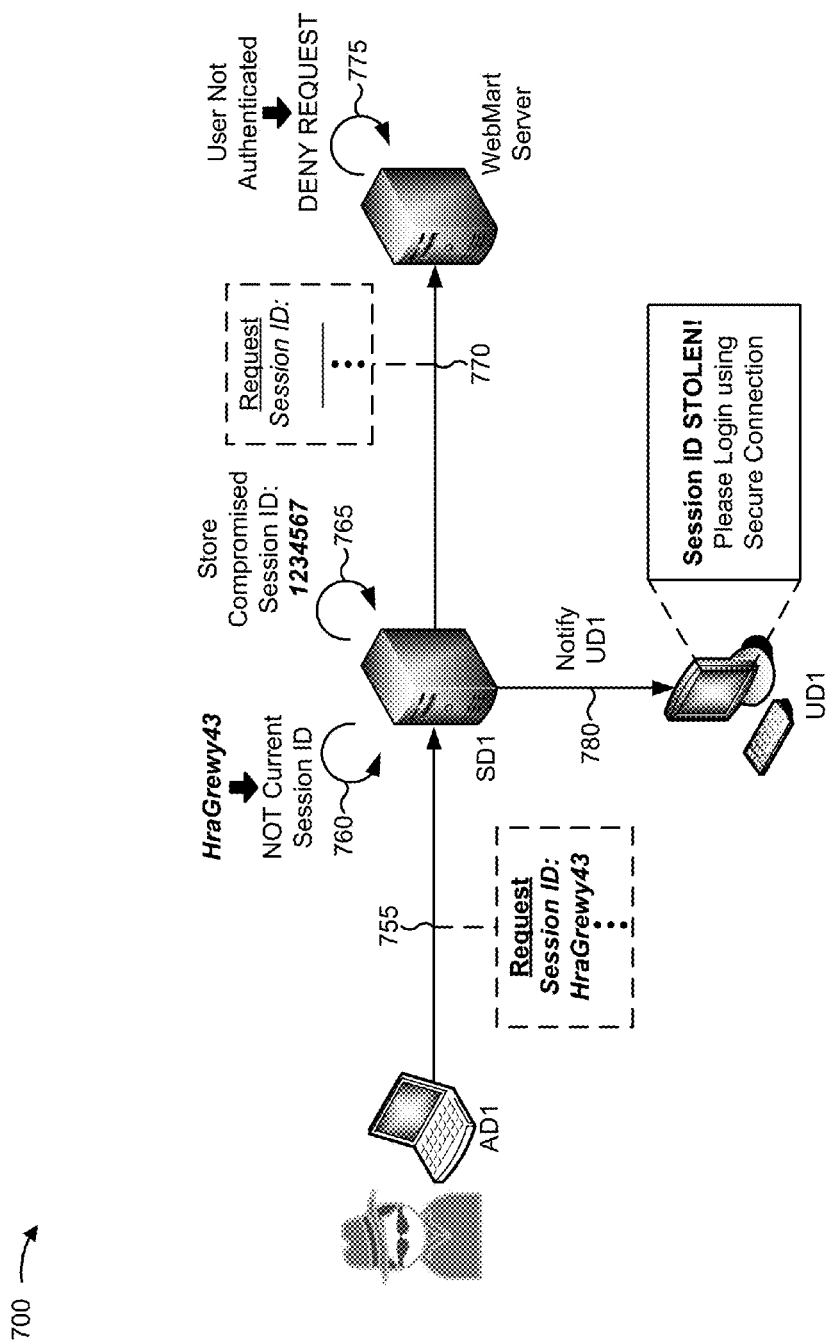

FIGS. 7A-7C are diagrams of an example implementation 700 relating to example process 600 shown in FIG. 6. For the purposes of example implementation 700, assume that a security device, SD1, has provided a first response to a first request provided by a user device, UD1. Further, assume that the first response included a first modified session identifier, HraGrewy43, and that SD1 stores information associated with the first modified session identifier.

As shown in FIG. 7A, and by reference number 705, UD1 may provide a second request to SD1. As shown, the request may include the HraGrewy43 session identifier. As shown by reference number 710, SD1 may determine (e.g., based on information stored by SD1) that the HraGrewy43 session identifier is a current session identifier (e.g., the HraGrewy43 identifier is the most recent modified session identifier, associated with the session between UD1 and a WebMart server, created by SD1). As shown by reference number 715, SD1 may determine an original session identifier (e.g., 1234567), associated with the HraGrewy43 identifier, by decrypting the modified session identifier (e.g., HraGrewy43→xtj 1234567) and by removing a salt value (e.g., xtj 1234567→1234567) added to the original session identifier. As shown by reference number 720, SD1 may forward the request, including the 1234567 session identifier, to the WebMart server.

As shown in FIG. 7B, and by reference number 725, the WebMart server may generate a response to the request, including the 1234567 session identifier. As shown by reference number 730, the WebMart server may provide the response to SD1. As shown by reference number 735, SD1 may modify the 1234567 session identifier (e.g., included in the response) by adding a salt value (e.g., 5 pk) to the 1234567 session identifier, and by encrypting the salted original session identifier (e.g., using an AES encryption algorithm) to create a modified session identifier, trHWEedsrA. As shown by reference number 740, SD1 may store information that identifies trHWEedsrA as the current session identifier. As shown by reference number 745, SD1 may also store information associated with the trHWEedsrA session identifier. As shown by reference number 750, SD1 may provide the response, including the trHWEedsrA session identifier, to UD1.

For the purposes of FIG. 7C, assume that a hacker associated with an attacker device, AD1, wishes to hijack the session between UD1 and the WebMart server using the HraGrewy43 session identifier (e.g., obtained by AD1 using an XSS attack). Further, assume that AD1 is attempting to hijack the session after UD1 has submitted a request including the HraGrewy43 session identifier (e.g., after SD1 has stored information indicating that the current session ID, associated with the session, is trHWEedsrA).

As shown in FIG. 7C, and by reference number 755, AD1 may send a request, including the HraGrewy43 session identifier, to SD1. As shown by reference number 760, SD1 may determine (e.g., based on information stored by SD1) that the HraGrewy43 session identifier is not the current session identifier (e.g., since the trHWEedsrA session identifier is the current session identifier). As shown by reference number 765, SD1 may store information indicating that the 1234567 session identifier (e.g., the original session identifier), associated with HraGrewy43 session identifier, has been compromised, and, as shown by reference number 770, SD1 may forward the request, without including any session information (e.g., SD1 may remove the HraGrewy43 session identifier from the request), to the WebMart server. As shown by reference number 775, the WebMart server may determine that the user is not authenticated (e.g., since no session information was included in the request), and the WebMart server may deny the request. As shown by reference number 780, SD1 may generate (e.g., based on information, stored by SD1, that associates the HraGrewy43 session identifier with UD1) and provide a notification to UD1 regarding the compromised HraGrewy43 session identifier (e.g., "Session ID STOLEN! Please login using secure connection").

As indicated above, FIGS. 7A-7C are provided merely as an example. Other examples are possible and may differ from what was described with regard to FIGS. 7A-7C.

Implementations described herein may allow a security device, associated with a user device and/or a server device, to prevent an attacker device from hijacking a session of the user device by modifying session information in a manner such that the security device may determine that the session information has been compromised.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A security device, comprising:
one or more processors to:
receive original session information from a server device,
the original session information including an original session identifier;
modify the original session identifier, using a first modification technique, to create a first modified session identifier,
the first modified session identifier being a modified version of the original session identifier;
provide the first modified session identifier to a user device;
receive, from the user device, a first request destined for the server device,
the first request including the first modified session identifier;

determine that the first modified session identifier is a current session identifier associated with a session between the user device and the server device;
determine the original session identifier based on the first modified session identifier;
forward the first request and the original session identifier to the server device;
receive a response to the first request from the server device,
    the response including the original session identifier;
modify the original session identifier, using a second modification technique, to create a second modified session identifier,
    the second modification technique being different than the first modification technique;
store information indicating that the current session identifier is the second modified session identifier;
provide the response, including the second modified session identifier, to the user device;
receive a second request destined for the server device,
    the second request including the first modified session identifier;
determine that the first modified session identifier is not the current session identifier based on the information indicating that the current session identifier is the second modified session identifier; and
provide the second request, without including session information, to the server device,
    the server device denying the second request based on not including the session information.

2. The security device of claim 1, where the one or more processors are further to: determine a string of characters to add to the original session information identifier; and where the one or more processors, when modifying the original session information identifier using the first modification technique, are to: modify the original session-identifier by adding the string of characters to the original session information identifier.

3. The security device of claim 1, where the one or more processors are further to: determine an encryption algorithm associated with modifying the original session information identifier; and where the one or more processors, when modifying the original session information identifier using the second modification technique, are to: modify the original session identifier based on the encryption algorithm.

4. The security device of claim 1, where the one or more processors, when storing the information indicating that the current session identifier is the second modified session identifier, are to:
store information associated with the second modification technique used to create the second modified session identifier.

5. The security device of claim 1, where the one or more processors are further to:
determine the current session identifier;
determine that the first modified session identifier does not match the current session identifier; and
where the one or more processors, when determining that the first modified session identifier is not the current session identifier, are to:
determine that the first modified session identifier is not the current session identifier based on determining that the first modified session identifier does not match the current session identifier.

6. The security device of claim 1, where the one or more processors, when determining that the first modified session identifier is not the current session identifier, are to:

determine that the first modified session identifier has been compromised; and
provide, to the user device, information indicating that the first modified session identifier has been compromised.

7. The security device of claim 1, where the one or more processors, when determining that the first modified session identifier is not the current session identifier, are to:
determine that the first modified session identifier has been compromised; and
store information that identifies the compromised first modified session identifier.

8. A computer-readable medium storing instructions, the instructions comprising:
one or more instructions that, when executed by one or more processors of a security device, cause the one or more processors to:
receive original session information from a server device,
    the original session information including an original session identifier;
modify the original session identifier, using a first modification technique, to create a first modified session identifier,
    the first modified session identifier being a modified version of the original session identifier;
provide the first modified session identifier to a user device;
receive, from the user device, a first request destined for the server device,
    the first request including the first modified session identifier;
determine that the first modified session identifier is a current session identifier associated with a session between the user device and the server device;
determine the original session identifier based on the first modified session identifier;
forward the first request and the original session identifier to the server device;
receive a response to the first request from the server device,
    the response including the original session identifier;
modify the original session identifier, using a second modification technique, to create second modified session identifier,
    the second modification technique being different than the first modification technique;
store information indicating that the current session identifier is the second modified session identifier;
provide the response, including the second modified session identifier, to the user device;
receive a second request destined for the server device,
    the second request including the first modified session identifier;
determine that the first modified session identifier is not the current session identifier based on the information indicating that the current session identifier is the second modified session identifier;
and
provide the second request, without including session information, to the server device,
    the server device denying the second request based on not including the session information.

9. The computer-readable medium of claim 8, where the one or more instructions, when executed by the one or more processors, further cause the one or more processors to: determine a string of characters to add to the original session information identifier; and where the one or more instructions, that cause the one or more processors to modify the original session information identifier using the second modification technique, cause the one or more processors to: modify the original session identifier by adding the string of characters to the original session information identifier.

10. The computer-readable medium of claim 8, where the one or more instructions, when executed by the one or more processors, further cause the one or more processors to: determine an encryption algorithm associated with modifying the original session information identifier; and where the one or more instructions, that cause the one or more processors to modify the original session information identifier using the first modification technique, cause the one or more processors to: modify the original session identifier based on the encryption algorithm.

11. The computer-readable medium of claim 8, where the one or more instructions, that cause the one or more processors to store the information indicating that the current session identifier is the second modified session identifier, cause the one or more processors to:
store information associated with the second modification technique used to create the second modified session identifier.

12. The computer-readable medium of claim 8, where the one or more instructions, when executed by the one or more processors, further cause the one or more processors to:
determine the current session identifier;
determine that the first modified session identifier matches the current session identifier; and
where the one or more instructions, that cause the one or more processors to determine that the first modified session identifier is not the current session identifier, cause the one or more processors to:
determine that the first modified session identifier is not the current session identifier based on determining that the first modified session identifier does not match the current session identifier.

13. The computer-readable medium of claim 8, where the one or more instructions, when executed by the one or more processors, further cause the one or more processors to:
determine information associated with the second modification technique used to create the second modified session identifier; and
where the one or more instructions, that cause the one or more processors to determine that the first modified session identifier is not the current session identifier, cause the one or more processors to:
determine that the first modified session identifier is not the current session identifier based on the information associated with the second modification technique.

14. A method, comprising: receiving, by a device and from a server device, original session information, the original session information including an original session identifier;
modifying, by the device, the original session identifier, using a first modification technique, to create a first modified session identifier, the first modified session identifier being a modified version of the original session identifier;
providing, by the device, the first modified session identifier to a user device;
receiving, by the device and from the user device, a first request destined for the server device, the first request including the first modified session identifier;
determining, by the device, that the first modified session identifier is a current session identifier associated with a session between the user device and the server device;
determining, by the device, the original session identifier based on the first modified session identifier;
forwarding, by the device, the first request and the original session identifier to the server device;
receiving, by device and from the server device, a response to the first request,
the response including the original session identifier;
modifying, by the device, the original session identifier, using a second modification technique, to create a second modified session identifier,
the second modification technique being different than the first modification technique;
storing, by the device, information indicating that the current session identifier is the second modified session identifier;
sending, by the device, the response including the second modified session identifier to the user device;
receiving, by the device, a second request destined for the server device, the second request including a particular session identifier;
determining, by the device, whether the particular session identifier is the current session identifier based on the information indicating that the current session identifier is the second modified session identifier; and providing, by the device, the second request based on determining whether the particular session identifier is the current session identifier, the second request including the original session identifier when the particular session identifier is the current session identifier, the second request excluding the original session identifier when the particular session identifier is not the current session identifier, the server device denying the second request based on excluding the original session identifier.

15. The method of claim 14, further comprising: determining a string of random characters to add to the original session identifier; and where modifying the original session identifier using the first modification technique comprises: modifying the original session identifier by adding the string of random characters to the original session identifier.

16. The method of claim 14, further comprising: determining an encryption technique associated with modifying the original session identifier; and where modifying the original session identifier using the second modification technique comprises: modifying the original session identifier based on the encryption technique.

17. The method of claim 14, where storing the information indicating that the current session identifier is the second modified session identifier comprises:
storing information associated with the second modification technique used to create the second modified session identifier.

18. The method of claim 14, further comprising:
determining the current session identifier;
determining that the first modified session identifier does not match the current session identifier; and
where determining whether the particular session identifier is the current session identifier comprises:
determining that the particular session identifier is not the current session identifier based on determining that the first modified session identifier does not match the current session identifier.

19. The method of claim 18, further comprising:
removing the particular session identifier from the second request; and
where providing the second request comprises:
providing the second request based on removing the particular session identifier from the second request.

20. The method of claim 14, further comprising:
determining the current session identifier;

determining that the second modified session identifier matches the current session identifier; and where determining whether the particular session identifier is the current session identifier comprises:

determining that the particular session identifier is the current session identifier based on determining that the second modified session identifier matches the current session identifier.

\* \* \* \* \*